United States Patent [19]

Bordenca

[11] 3,742,052

[45] June 26, 1973

[54] DIISOPHORONE DERIVATIVES AND COMPOSITIONS CONTAINING SAME

[75] Inventor: Carl Bordenca, Rocky River, Ohio

[73] Assignee: SCM Corporation, Cleveland, Ohio

[22] Filed: Sept. 22, 1970

[21] Appl. No.: 74,512

Related U.S. Application Data

[63] Continuation-in-part of Ser. No. 661,493, July 26, 1967, abandoned.

[52] U.S. Cl............. 260/566 B, 424/325, 424/327, 424/59
[51] Int. Cl.......................................... C07c 119/00
[58] Field of Search ................................. 260/566 B

[56] References Cited
UNITED STATES PATENTS 2,406,652  8/1946  Ballard........................... 260/566 B

FOREIGN PATENTS OR APPLICATIONS 931,507  7/1963  Great Britain .................. 260/566 B

OTHER PUBLICATIONS

Kabas et al. "Tetrahelion" Vol. 22, pp. 1219–1226, (1960).

*Primary Examiner*—Leon Zitver
*Assistant Examiner*—Gerald A. Schwartz
*Attorney*—Harold M. Baum, Merton H. Douthitt, Russell L. Brewer, Howard G. Bruss and James E. Carson

[57] ABSTRACT

Diisophorone derivatives and ultraviolet radiation-screening compositions containing the diisophorone derivatives have been prepared and are described.

Stable compositions comprising insecticidally active cyclopropane carboxylic acid compounds such as pyrethrinoids which are degradable by ultraviolet radiation and diisophorone derivatives which are resistant to decomposition by ultraviolet radiation are described.

The ultraviolet radiation-screening properties and the resistance to degration by ultraviolet light of the diisophorone derivative are shown. The stabilization of cyclopropane carboxylic acid compounds and the synergizing effects of diisophorone hydrazone on the insecticidal activity of pyrethrinoids are demonstrated.

7 Claims, No Drawings

DIISOPHORONE DERIVATIVES AND COMPOSITIONS CONTAINING SAME

This application is a continuation-in-part of U.S. patent application Ser. No. 661,493, filed July 26, 1967, now abandoned, having the same title and assigned to the same assignee.

This application contains subject matter similar to that of pending application Ser. No. 57,752, filed July 22, 1970, also assigned to the same assignee.

The invention relates to diisophorone derivatives resistant to degradation by ultraviolet radiation and to the use of these derivatives in ultraviolet radiation-screening compositions.

The invention is advantageous in that it provides ultraviolet radiation-screening compositions in which a broad spectrum of products which are ordinarily degradable by ultraviolet light are stabilized against such degradation. The invention is also advantageous in that the diisophorone derivative can be incorporated in cosmetic formulations which can be used in the protection of human skin against sunburn.

The invention is particularly advantageous in that it provides certain hereinafter-defined insecticidally active compositions and formulations in which the insecticidally active component is degradable by ultraviolet radiation and wherein the insecticidally active component is stabilized against ultraviolet decomposition and synergized in its insecticidal activity by the inclusion of a diisophorone derivative in the composition or formulation.

The terms "ultraviolet radiation," "UV" or "UV radiation" as used herein are intended to mean and to refer to radiation from sources having within their radiation spectrum a wave length of between 2,100 and 3,500 A.

The term "insecticidal composition" as used herein is intended to mean and to refer to compositions containing (1) a UV degradable insecticidally active cyclopropane carboxylic acid compound, and (2) at least one diisophorone derivative.

The term "insecticidal formulation" as used herein is intended to mean the combination of (1) the above-described insecticidal composition, and (2) one or more components conventionally employed as diluents or carriers in commercially-marketed insecticides or formulations thereof.

In its broadest aspect the invention provides a compound of the formula

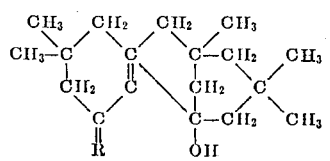

where R is selected from the group consisting of:

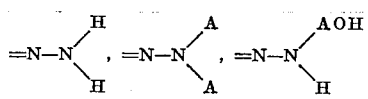

and

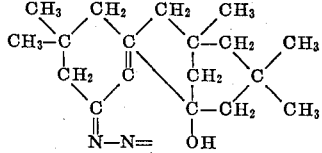

where A is lower alkyl and AOH is lower alkylol.

In the foregoing formula A is lower alkyl and can represent methyl ethyl n-propyl, 2-propyl, n-butyl, t-butyl, secbutyl pentyl or hexyl groups; AOH is lower alkylol and can represent methylol, ethylol, propylol, butylol, hexylol groups and position isomers thereof. Compounds wherein A is methyl and AOH is ethylol have been found to be particularly advantageous ultraviolet light absorbers and pyrethrinoid synergists.

Diisophorone (sometimes referred to as isophorone dimer) from which the diisophorone derivatives employed in the compositions of this invention are formed is a known compound and is officially named (American Chemical Society official nomenclature): 2,3,5,6,-7,8,9,10-Octahydro-5-hydroxy-2,2,7,7,9-pentamethyl-5,9-methanobenzocycloocten-4-(IH)-one.

The term "ultraviolet molecular extinction coefficient" is used herein in its conventional sense and is the reciprocal of that thickness which reduces the intensity of the transmitted light to one-tenth of its original value.

The screening compositions can be applied to or incorporated with a wide variety of UV degradable materials such as UV degradable polymers (for example, polyvinyl chloride, polyvinyl acetate, polyamide polymers such as nylon, etc), insecticides, organic pigments, human skin and the like which, under storage or use conditions, come in contact with UV radiation. From a practical standpoint such radiation usually comprises sunlight, although the radiation may be an artificial source such as, for example, a mercury arc light or a UV sunlamp.

Embodiments of the ultraviolet radiation-screening compositions include the aforementioned diisophorone derivatives and coating compositions or coatings containing one or more organic pigments or colorants which fade during exposure to a UV radiation source such as sunlight; polymer films or coatings such as, for example, polyvinyl chloride or acetate films; or coatings containing such polymers which are degradable and discolor or become brittle upon prolonged exposure to UV radiation. Still another embodiment of the UV screening compositions includes suntan preparations wherein a diisophorone derivative is incorporated in a conventional cosmetic lotion or cream which is applied to the human skin to prevent sunburn. Diisophorone derivatives, when incorporated in or applied to such materials, provide compositions which resist the undesirable effects of sunlight or other UV radiation on the UV degradable components of the materials. Specific particularly advantageous diisophorone derivatives falling in the scope of Formula I are:
  diisophorone hydrazone
  diisophorone dimethyl hydrazone
  diisophorone β-hydroxyethyl hydrazone
  di(diisophorone) azine The foregoing derivative compounds have a maximum ultraviolet molecular extinction coefficient of between 2,100 and 3,500 A.

A large number of compounds other than diisophorone derivatives are known to be useful in screening ultraviolet radiation. However, the vast majority of these compounds are unstable to and are degraded by ultraviolet light radiation during exposure and lose their UV screening properties within a relatively short period of time when exposed to UV radiation. The diisophorone derivatives herein described are resistant to degradation by UV radiation and when incorporated with other UV degradable materials, protect those materials against decomposition by UV radiation.

The amount of diisophorone derivative employed in the UV screening compositions will depend upon a number of factors including, for example, the intensity and wave length of the UV radiation to be protected against and the particular end-use intended. Normally, compositions containing from about 0.1 per cent to about 5 per cent of the diisophorone derivative will be sufficient to prevent the adverse effects occasioned by utraviolet radiation which is usually encountered under practical use conditions.

In one embodiment of a UV screening composition of this invention a composition comprising di(diisophorone) azine can be incorporated in polymers such as polyvinyl chloride and/or polyvinyl acetate to prevent the UV degradation of these materials when they are exposed to sunlight.

In aother embodiment of a UV screening composition of this invention, diisophorone hydrazone or di(-diisophorone) azine can be incorporated in conventional cosmetic lotions or creams which, when applied to the human skin, will prevent sunburn due to their UV screening properties. Usually, concentrations of from about 1 to about 5 weight per cent of these diisophorone derivatives can be effectively employed in sunscreen lotions.

Another and a particularly advantageous UV screening composition falling within the scope of this invention is a composition comprising (1) an insecticidally active cyclopropane carboxylic acid compound degradable by ultraviolet radiation and (2) a diisophorone derivative resistant to decomposition by ultraviolet radiation in a proportion sufficient to retard the degradation of said compound, said derivative having a maximum ultraviolet radiation molecular extinction coefficient between about 2,200 and 3,200 A. The insecticidal compositions are useful in that they provide insecticides which have both contact and residual insecticidal activity.

Cyclopropane carboxylic acid compounds (sometimes also called chrysanthemumic acid compounds due to the botanical origin of the more prominent of those compounds), while capable of knocking down insects such as flies, roaches, mosquitoes, and the like in relatively dilute contact concentrations, kill only a small fraction of the insects contacted. Also, under practical use conditions cyclopropane carboxylic acid compounds usually have no residual insecticidal activity, presumably due in part, to their rapid decomposition by the ultraviolet radiation present in ordinary light and/or sunlight.

By way of example, the characteristic action of cyclopropane carboxylic acid compounds on insects is a very rapid knockdown followed by substantial recovery of the insect. An approximately threefold increase in dosage is required to produce a 24-hour per cent mortality equivalent to the 25-minute per cent knockdown of houseflies (Kirk-Othmer, Encyclopedia of Chemical Technology, Volume 11, page 686, 1966).

As will be apparent from the specific examples, the combination of cyclopropane carboxylic acid compounds and diisophorone derivatives provides insecticidal compositions which have the same or a more effective knockdown of insects such as houseflies and cockroaches than cyclopropane carboxylic acid compounds when used alone. Surprisingly, the percentage of 24-hour kill is significantly higher when diisophorone derivatives are combined with cyclopropane carboxylic acid compounds in UV screening insecticidal compositions.

The reasons for this increase in kill are not known with certainty and applicant does not intend to be bound by theoretical considerations. However, it is believed that the increase in kill is due, at least in part, to the protection of the cyclopropane carboxylic acid compounds by the diisophorone derivatives against UV decomposition.

Cyclopropane carboxylic acid compounds which can be employed include naturally occurring and synthetic compounds. Cyclopropane carboxylic acid compounds derived from natural sources are sometimes referred to as pyrethrinoids or pyrethroids, which are cyclopropane dicarboxylic acid products consisting of or derived from the dried flower heads of *Chrysanthemum coccineum* and *Chrysanthemum cinerariaefolium*. Extracts and/or compounds obtained from these flower heads include: the pyrethrolone ester of the cyclopropane carboxylic acid compounds commonly referred to as chrysanthemummonocarboxylic acid (obtained from the flower heads of *Chrysanthemum coccineum* and known as pyrethrin I); the pyrethrolone ester of the cyclopropane carboxylic acid compound commonly referred to as chrysanthemumdicarboxylic acid monomethyl ester (obtained from the flower heads of *Chrysanthemum coccineum* and known as pyrethrin II); the 3-(2-butenyl)-4-methyl-2-oxo-3-cyclopenten-1-yl ester of chrysanthemummonocarboxylic acid (obtained from the flower heads of *Chrysanthemum cinerariaefolium* and known as cinerin I); and the 3-(2-butenyl)-4-methyl-2-oxo-3-cyclopenten-1-yl ester of chrysanthemumdicarboxylic acid monomethyl ester (obtained from the flower heads of *Chrysanthemum cinerariaefolium* and known as cinerin II). Synthetic cyclopropane carboxylic acid compounds are analogs of the cinerins [e.g., the dl-2-allyl-4-hydroxy-3-methyl-2-cyclopenten-1-one ester of cis- and trans-dl-chrysanthemummonocarboxylic acid and the 3-allyl-4-methyl-2-oxo-3-cyclopenten-1-yl ester of 2,2-dimethyl-3-(2-methylpropenyl) cyclopropane carboxylic acid]. Mixtures of the allyl analogs of the cinerins are known as allethrin. Commercial products of natural origin, referred to as "pyrethrin," are mixtures of pyrethrin I, pyrethrin II, cinerin I and cinerin II.

Other examples of synthetic chrysanthemumcarboxylic acid compounds include synthetic chrysanthemumcarboxylic acid compounds referred to in Kirk-Othmer, Encyclopedia of Chemical Technology, Volume II, pages 684–687, 1966, and synthetic compounds referred to in U.S. Pat. Nos. 3,127,414; 3,268,396; 3,268,398; 3,268,400; 3,268,551; and 3,318,766.

As previously noted, the aforementioned cyclopropane carboxylic acid compounds, although they absorb ultraviolet light, are usually decomposed or degraded during the absorption of ultraviolet light and lose a considerable portion of their insecticidal activity.

The present invention is based, in part, on the discovery that diisophorone derivatives, when mixed with cyclopropane carboxylic acid compounds, will prevent the degradation of the latter when exposed to ultraviolet light.

This discovery is significant because under use conditions, when insects are contacted with cyclopropane carboxylic acid compounds, that portion of the compounds which contacts areas other than the insect rapidly loses its insecticidal activity through ultraviolet degradation. When protected by the diisophorone derivatives, insects which contact areas containing undegraded cyclopropane carboxylic acid compounds are recontacted with these compounds. Residual activity is thus conferred upon cyclopropane carboxylic acid compounds when compositions containing these compounds also contain diisophorone derivatives which would otherwise be lost due to UV decomposition.

Particularly advantageous insecticidal compositions are those wherein the cyclopropane carboxylic acid compound is pyrethrinoid; e.g., pyrethrin I, pyrethrin II, cinerinI, cinerin II, or a mixture of one or more of these materials, since these cyclopropane carboxylic acid compounds are the most economically feasible and are the more readily available. Compositions containing these pyrethrinoids and at least one diisophorone derivative such as diisophorone hydrazone or a monocarboxylic acid ester of diisophorone having a UV molecular extinction coefficient within the range hereinbefore described will stabilize pyrethrinoids against decomposition by ultraviolet light for prolonged periods of time; e.g., up to several weeks or longer.

The amount of diisophorone derivative employed in the compositions of this invention can vary widely but is usually present in an amount or proportion sufficient to retard the degradation of the cyclopropane carboxylic acid compound and is dependent upon the amount of cyclopropane carboxylic acid compound present in the composition. Advantageous compositions have been found to contain a weight ratio of diisophorone:-pyrethrenoid between about 1:50 to about 90:1. Such weight ratio range will provide compositions which can be further diluted to prepare insecticidal formulations suitable for end-use in which the cyclopropane carboxylic acid compound is protected against UV decomposition for practical periods of time; e.g., up to 12 hours or longer.

Although diisophorone derivative:cyclopropane carboxylic acid compound weight ratio of less than 1:50 can sometimes be employed in compositions of this invention, such compositions, when incorporated and diluted into insecticidal formulations, as hereinafter described, will often not provide sufficient diisophorone derivative to protect the cyclopropane carboxylic acid compound against UV degradation.

Although weight ratios of greater than 90:1 can be employed, there is usually no advantage and there is often necessarily high concentration of diisophorone derivative in the composition. Although any of the diisophorone derivatives can be suitably employed, particularly advantageous diisophorone derivatives have been found to be diisophorone hydrazone, di(diisophorone) azine, diisophorone neopentanoate, and diisophorone phenyl acetate. Of these advantageous diisophorone derivatives, diisophorone hydrazone is preferred since this compound, when incorporated in compositions containing a cyclopropane carboxylic acid compound, has been found to be particularly useful in synergizing the insecticidal activity of cyclopropane carboxylic acid compounds in addition to stabilizing these latter compounds against UV decomposition.

Although any of the natural and synthetic cyclopropane carboxylic acid compounds can be used in the insecticidal compositions, cyclopropane carboxylic acid compounds; i.e., pyrethrinoid compounds, of natural origin are preferred due to their availability. Such naturally occurring cyclopropane carboxylic acid compounds include pyrethrin I, pyrethrin II, cinerin I, cinerin II, or mixtures thereof. Of these pyrethrinoid compounds, mixtures of pyrethrin I and pyrethrin II are particularly preferred for economic reasons.

One advantageous embodiment of an insecticidal composition falling within the scope of this invention comprises a mixture of a pyrethrinoid compound and a diisophorone derivative having a diisophorone derivative:pyrethrinoid weight ratio between about 1:50 to 90:1, a preferred composition being one in which the pyrethrinoid compound is a mixture of pyrethrin I and pyrethrin II and a particularly preferred composition is one in which the diisophorone derivative is diisophorone hydrazone. Such compositions are particularly preferred because of the UV protective properties of the diisophorone hydrazone and also because the diisophorone hydrazone synergizes the insecticidal activity of such compounds to a particularly significant degree.

Diisophorone derivatives do not, in themselves, exhibit outstanding insecticidal activity. It was, therefore, both surprising and unexpected that the combination of diisophorone hydrazone and pyrethrinoid compositions effects an insect kill greater than that obtained in the pyrethrinoid compound as used alone.

In another aspect, the invention provides insecticidal formulations wherein the insecticidally active UV compositions can be diluted for field use in concentrations effective for killing insects. The insecticidal formulations of this invention comprise any of the hereinbefore defined insecticidal compositions combined with from about 1 to about 90 per cent, basis the weight of the formulation, of a carrier conventionally used in the insecticidal formulation art. The formulations can comprise from about 1 to about 50 weight per cent of a carrier and such formulations are generally suitable for further dilution for end-use purposes. Usually, formulations containing from about 0.5 to about 10 per cent by weight of pyrethrinoid, the balance consisting substantially of diisophorone derivative, preferably diisophorone hydrazone and carrier, are preferred for practical reasons.

The carrier can comprise a wide variety of materials conventionally employed in insecticidal formulations. The carrier should be inert; that is, it should be incapable of undergoing a chemical reaction with either the diisophorone derivative or with the pyrethrinoid under ambient storage or end-use conditions. Also, the carrier should be one that will not be harmful to the environment other than the insect in which it is employed.

The carrier can comprise a wide variety of organic or inorganic liquid, solid or semi-solid materials used, in carrier formulations conventionally employed in commercial insecticide products.

Examples of liquid organic carriers include liquid aliphatic hydrocarbons such as pentane, nonane and decane, and their analogs as well as liquid hydrocarbons. Other liquid hydrocarbons include oils produced by the distillation of coal and the distillation of various types and grades of petroleum stocks. Petroleum oils obtained from petroleum stocks which are especially desirable include kerosene oils; e.g., oils composed of hydrocarbon mixtures of low molecular weight (for example, hydrocarbons containing from 10–16 carbon atoms) which are obtained by fractional distillation of petroleum at temperatures between 360° and 510° F. and which usually have a flash point between 150° and 185° F.

Other petroleum oils include those generally referred to in the art as agricultural spray oils. These light and medium oils consist of the middle fractions in the distillation of petroleum and have a viscosity in the range of 40–85sec. Saybolt at 100° F. and are only slightly volatile. Such oils are usually highly refined and contain only minute amounts of unsaturated compounds as measured by standard sulfonation tests. The customary sulfonation range of such oils is between 90 and 94 per cent unsulfonatable residue. These oils, sometimes referred to as paraffin oils, can be emulsified with water and used in lower concentrations in the form of sprays. Tall oils obtained from the sulfate digestion of woodpulp may also be employed.

In addition to the above-mentioned liquid hydrocarbons, and usually in conjunction therewith, the carrier can contain a conventional emulsifying agent such as a non-ionic surfactant, for example, an ethylene oxide condensate of an alkyl phenol; or an ionic surfactant, for example, an alkali metal salt of an alkyl benzene sulfonic acid. Such emulsifiers are conventionally added to enable the composition to be diluted with water for end-use application.

When paraffin oils are employed as the carrier in the formulations of this invention, they are usually used in conjunction with an emulsifier mixture which is diluted with water just prior to end-use application. By way of example, the pyrethrinoil-diisophorone hydrazone compositions are dissolved in a paraffin oil containing an emulsifier and such compositions are diluted with water to form an oil-in-water emulsion. These products, when atomized and sprayed on insects or insect-infested areas, are highly effective against insects and insect eggs in the area.

Other advantageous organic liquid carriers include liquid terpene hydrocarbons, alcohols such as α-pinene, dipentene, terpineol, borneol, and the like. Still other carriers include organic solvents such as aliphatic and aromatic alcohols, aldehydes and ketones. Suitable aliphatic monohydroxy alcohols include methyl, ethyl, n-propyl, iso-propyl, n-butyl, t-butyl, sec-butyl alcohols. Suitable dihydroxy alcohols include glycol such as ethylene and propylene and the pinacols; for example, alcohols having the formula $C_6H_{12}(OH)_2$. Suitable polyhydroxy alcohols include glycerol, sorbitol, erythritol, arabitol, and the like. Suitable aliphatic alcohols include cyclopentyl and cyclohexyl alcohols.

Aromatic and aliphatic esters, aldehydes and ketones can often be used in combination with the above-mentioned alcohols. Still other liquid carriers, including higher boiling petroleum products such as mineral oil and higher alcohols (sometimes referred to as "liquid waxes") can also be employed. Additionally, conventional potentiators such as piperonylbutoxide can be used as the carrier or one component of the carrier in the formulations of this invention. Solid carriers which may be employed in the formulations include finely divided organic and inorganic solid materials.

Examples of finely divided solid inorganic carriers include siliceous minerals such as clay, for example, bentonite, attapulgite, Fuller's Earth, diatomaceous earth, kaolin, mica, talc, finely divided quartz, etc., as well as synthetically prepared siliceous materials including silica arogels, precipitated and fume silicas.

Examples of finely divided solid organic materials include starch, flour, sugar, powdered sawdust, casein, gelatin, and the like; examples of semi-solid organic carriers which can be used per se or incorporated in liquid or solid formulations include petroleum jelly, lanolin, and the like, and mixtures of these with any of the above-defined solid-liquid carriers (and emulsifiers when desired) in proportions such as to provide solid, semi-solid, or liquid consistencies within the formulations.

The above-described insecticide formulations can be employed per se or can be diluted with suitable liquids to exterminate common insect pests such as roaches, termites, beetles, flies, weevils, lice, moths, mice, ticks, and the like. These formulations, when used to contact an insect environment effectively cause a disappearance of the insect from environment.

The term "insect environment" as used herein is intended to mean and to include (1) areas or surfaces which are infested with, or which are susceptible to infestation by, common insect pests such as those above-described, and (2) surfaces of the body of the insect itself including the exoskeleton and non-skeletal surfaces of the insect.

The formulations of this invention also provide a process for killing insects wherein insect pests are killed by contacting a portion of the exoskeleton of the insect with the diisophorone hydrazone-pyrethrinoid compositions. The contact may be accomplished directly; for example, by atomizing the formulation into the air as a liquid or as a dust so that the material contacts the insect directly. Alternatively, the contact may be indirectly affected by contacting surfaces on which the insects may alight or crawl.

By way of example, wooden joists or attic beams infested with roaches or termites can be contacted with the formulations and such insects crawling over the joists or beams will pick up sufficient amounts of active material to cause death. Also by way of example, insect-infested animals such as dogs with fleas or poultry with lice may be treated with the formulations by contacting the fur and/or feathers of the animal, thereby ending the insect infestation. Also by way of example, granaries or silos may be treated with the formulations of this invention immediately prior to grain storage to prevent weevil and other insect infestations in the grains to be subsequently stored.

One advantageous embodiment of a formulation of this invention comprises from about 0.1 to about 25 weight per cent of a composition comprising the combination of pyrethrinoid-diisophorone hereinbefore described and from about 99.9 per cent to about 75 weight per cent of one or more of the hereinbefore defined carriers. Formulations containing from between 5 to 25 weight per cent of the diisophorone hydrazone-pyrethrinoid compositions are sometimes referred to as "concentrates" and can be sold in the market with directions for further dilution immediately prior to end-use. End-use formulations falling within the scope of the above formulation usually contain from about 0.1 to about 0.3 weight per cent of the diisophorone hydrazone-pyrethrinoid formulations.

The novel diisophorone hydrazone and azine derivatives which are employed in the UV screening insecticidal compositions and/or formulations of this invention can be suitably prepared by a process which comprises the steps of (1) dimerizing isophorone to form diisophorone; (2) reacting the diisophorone (sometimes hereinafter referred to as isophorone dimer) with a suitable hydrazine hydrate at room temperature until diisophorone hydrazone is formed. Diisophorone; e.g., isophorone dimer, is a known compound whose method of preparation has been described by Kabas & Rutz in Volume 22, pages 1219–1266, of the "Tetrahedron Journal" published by the Pergamon Press. It is prepared by treating isophorone with aqueous alkali hydroxides at elevated temperatures to form a brown reaction mixture from which diisophorone can be readily separated by distillation in yields about 90 per cent. The solid isophorone dimer, upon elemental analysis, has the empirical formula $C_{18}H_{28}O_2$ and is characterized by an infrared absorption spectra which exhibits a hydroxyl band at 3,480 centimeters$^{-1}$, a single carbonyl band at 1,655 centimeters$^{-1}$, and an olefinic unsaturation band at 1,635 centimeters$^{-1}$. The isophorone dimer has a molecular weight of 276.4 and a melting point of 82°–84° C.

For example, the reaction of the isophorone dimer with hydrazine hydrate is accomplished by preparing a solution of diisophorone in lower aliphatic alcohol and preparing an aqueous solution of hydrazine hydrate dissolved in water, adding the hydrazine hydrate solution to the isophorone-alcohol solution slowly with agitation, refluxing the resultant mixture until the diisophorone hydrazone is formed. Diisophorone hydrazone can then be recovered in crystalline form by cooling the mixture, the crystals being conventionally separated by decantation, centrifugation, or the like, to obtain a yellowish-white crystal which after purification and after recrystallization in a lower aliphatic alcohol has a melting point of 122°–124° C.

By way of further example, di(diisophorone) azine can be suitably prepared, for example, by reacting diisophorone and hydrazine hydrate in glacial acetic acid and heating the reaction mixture until solid di(diisophorone) azine appears in the bulk of the liquid phase of the mixture. The solid compound can then be conventionally recovered by precipitation, filtration, centrifugation, and the like.

As will be hereinafter evident from the specific examples, the ultraviolet radiation screening compositions can be prepared by dispersing diisophorone derivative in a liquid or solid diluent which can, if desired, contain a wide variety of other ingredients including cosmetic and UV degradable paint formulations, polymer films or formulations including polyvinyl and polyamine polymers and insecticide formulations containing cyclopropane carboxylic acid compounds. When the diisophorone derivative is the sole ingredient dispersed in the diluent, it can be applied to UV degradable articles such as polyethylene or polyamide films or fibers or to surfaces containing a UV degradable colorant or the material can be dispersed directly in formulations either liquid or solid which contain these materials.

The following specific examples are intended to illustrate the invention but not to limit the scope thereof, parts and percentages being by weight unless otherwise specified.

EXAMPLE 1

The Preparation of Diisophorone Neopentanoate

Into a one-liter, three-neck, round-bottomed flask equipped with a magnetic stirrer, thermometer, reflux condenser and Barrett trap there was placed 125 grams (0.45 mol) of isophorone dimer, 69 grams (0.68 mol) of neopentanoic acid, 200 milliliters of toluene and four drops of concentrated sulfuric acid. The mixture was heated to reflux and agitated at reflux until water, which was evolved during the reaction, was completely driven off. The reflux time was 47-½ hours. The contents of the flask were cooled and neutralized with 5 per cent aqueous sodium carbonate solution, washed once with water and dried over anhydrous magnesium sulfate.

The solvent was removed and the reaction mixture distilled under reduced pressure. The fraction which boiled between 130° and 136° C. at 0.2 millimeters of mercury pressure was collected. Vapor phase chromatographic analysis of this fraction indicated that it contained 94.8 per cent diisophorone neopentanoate and 5.2 per cent unreacted diisophorone. The product was a waxy solid which melted at 74°–77° C. at atmospheric pressure. The ultraviolet spectra showed a maximum absorbance at 2,150 A. and a molecular extinction coefficient of 8940.

EXAMPLE 2

The Preparation of Diisophorone Phenylacetate

Into the reaction vessel described in Example 1 there was placed 125 grams (0.45 mol) of diisophorone, 92 grams (0.68 mol) of phenylacetic acid, 200 milliliters toluene and four drops of concentrated sulfuric acid, the latter being employed to catalyze the reaction. The mixture was heated to reflux and stirred at reflux until the evolution of water was completed. Total reflux time was 65-½ hours. The contents of the reaction vessel were cooled to room temperature and neutralized with 5 per cent aqueous sodium carbonate solution. It was then washed with water and dried over anhydrous magnesium sulfate. The solvent was removed and the ester was distilled under reduced pressure. The fraction which boiled between 178°–183° C. at 0.1 milliliter of mercury pressure was collected. Vapor phase chromatographic analysis indicated that the material consisted of 97.3 per cent diisophorone phenylacetate. The material was a yellow solid having a melting range of 92.5°–100° C. The ultraviolet absorbance showed a maximum absorbance at 2,510 A. and had a molecular extinction coefficient of 9076.

EXAMPLE 3

The Preparation of Diisophorone Hydrazone

Fifty grams (0.18 mol) of diisophorone were dissolved in 40 milliliters of 99 per cent of ethanol to provide an alcoholic solution of diisophorone. An aqueous solution containing 85 per cent hydrazine hydrate and 15 per cent water was prepared by dissolving the appropriate amount of hydrazine hydrate in water. 16 grams aqueous hydrazine hydrate containing 0.27 mol of hydrazine was added to the solution of diisophorone which had been placed in a laboratory reaction vessel equipped with an electric stirrer and a reflux condenser and cooling jacket. The 16 grams of 85 per cent aqueous hydrazine hydrate was then slowly added to the diisophorone solution over a 30-minute period while the solution was mechanically agitated. Thereafter, while agitation was continued, the resulting mixture was refluxed for 2-½ hours after which time it was cooled in a jacket of ice water. During the cooling, a buff-colored crystalline material separated from the reaction mixture and was recovered by filtration. 51-1/10 grams of crude diisophorone hydrazone having a melting point of 120°–121.5° C. was obtained. The material was recrystallized in 60 grams of ethanol, after which 50.8 grams of purified diisophorone hydrazone having a melting point of 122°–124° C. was obtained. The yield was 96.8 per cent of that theoretically expected based on the reactants employed. The diisophorone hydrazone crystals were analyzed using vapor phase chromatographic techniques and were found to consist of substantially pure diisophorone hydrazone. The infrared absorption spectra of diisophorone hydrazone is shown in the accompanying figure.

EXAMPLE 4

The Preparation of Di(diisophorone) azine

Into a reaction vessel equipped with a cooling jacket there was added 100 grams diisophorone, 200 milliliters glacial acetic acid, 40 grams of hydrazine hydrate, 4.5 grams of water. The resulting mixture was stirred and maintained at between 35° and 40° C. by cooling. The mixture was then heated at 70° C. for three hours after which time a precipitate appeared. After 18 hours of heating the mixture was cooled and filtered yielding 126 grams of a solid product. The product was washed with 126 grams glacial acetic acid and then with 150 grams of water. Traces of acetic acid were removed by washing with hot sodium bicarbonate solution and then rewashed with water. 91 grams of di(diisophorone) azine and crystals were obtained. Upon recrystallization from heptane, the material melted at 199°–204° C. The extinction coefficient of the di(diisophorone) azine in methanol was 25,494 at 3,150 A.

EXAMPLE 5

Insecticidally Active UV Screening Composition

A standard solution containing 19.8 per cent of a naturally occurring mixture of pyrethrin I, pyrethrin II, cinerin I and cinerin II was prepared.

To one portion of this solution there was added 0.2 per cent of diisophorone hydrazone. Another portion of the solution served as a control. The solutions were exposed to sunlight for a period of 30 days. Pyrethrin analyses using the colorimetric method of Sweeney were conducted at 12 and 30 days on the pyrethrin solution (control) and the pyrethrin solution containing diisophorone hydrazone. At 12 days the pyrethrin content of the control solution had decreased from 19.8 per cent to 17.69 per cent, indicating decomposition of 10 per cent of the pyrethrin. The material containing the inhibitor analyzed at 19.2 per cent pyrethrin indicating a loss of 3 per cent pyrethrin due to decomposition of the ultraviolet radiation of sunlight. Analysis at 30 days showed that the control sample containing pyrethrin only contained 83 per cent pyrethrins indicating a loss of 17 per cent due to pyrethrin decomposition and ultraviolet sunlight. Conversely, the sample containing pyrethrin and the diisophorone hydrazone analyzed at 18.84 per cent pyrethrins indicating a loss of 4.5 per cent pyrethrins due to decomposition and ultraviolet sunlight over the 30-day period.

When the diisophorone content of the solution was doubled, substantially no pyrethrin decomposition occurred.

EXAMPLE 6

Insecticidal Formulations

The following eight compositions containing the ingredients and the percentages listed in Table 1 below were prepared. Compositions 1 and 2 were experimental controls, contained diisophorone hydrazone in the amount specified but did not contain pyrethrins. Compositions 3 and 4 were also experimental controls; contained pyrethrins in the amounts specified but did not contain diisophorone hydrazone. These compositions were employed for comparative purposes in the insecticidal evaluation tests of this example. Compositions 5 through 8 were experimental formulations which contained varying quantities of diisophorone hydrazone and pyrethrins in the amounts specified in Table 1.

The Compositions were prepared by dispersing diisophorone hydrazone and/or the pyrethrins in 10 milliliters of acetone. To this dispersion there was added Triton X-100, a commercially available nonionic surfactant which is a condensate of ethylene oxide and octyl phenol manufactured by Rohm & Haas, Inc. This formulation was dispersed in water and insect contact was effected by spraying the water dispersions immediately above cages containing houseflies.

TABLE I

| Ingredient | Composition No. (percent) | | | | | | | |
|---|---|---|---|---|---|---|---|---|
|  | 1 | 2 | 3 | 4 | 5 | 6 | 7 | 8 |
| Diisophorone hydrazone | 0.25 | 0.1 |  |  | 0.25 | 0.25 | 0.1 | 0.1 |
| Pyrethrin* |  |  | 0.02 | 0.01 | 0.02 | 0.01 | 0.02 | 0.01 |
| Acetone | 10.0 | 10.0 | 10.0 | 10.0 | 10.0 | 10.0 | 10.0 | 10.0 |
| Triton X-100** | 1.0 | 1.0 | 1.0 | 1.0 | 1.0 | 1.0 | 1.0 | 1.0 |
| Water | 88.75 | 88.9 | 88.98 | 88.99 | 89.73 | 88.74 | 88.83 | 88.89 |

*A commercially available pyrethrin insecticide mixture containing pyrethrin I and pyrethrin II obtained by extraction of the flowers of *Chrysanthemum coccineum*.
**A commercially available nonionic surfactant manufactured by Rohm & Haas, Inc.

EXAMPLE 7

Insecticidal Activity of Insecticidal Formulations Against Houseflies

Eight separate screen sleeve cages 10 inches in diameter and 10 inches high containing 50 houseflies each were sprayed using a typical sprayer with 5 milliliters of the above-described formulations. The spray was emitted from the nozzle of the spraying device at a distance of 12 inches above the cages.

The flies in the cage sprayed were observed for a knockdown at 15 minutes, 60 minutes, and 24 hours for death.

The above experiments were repeated using different houseflies and the results of the two (replicate) experiments were combined in the data shown in Table II below.

TABLE II

| Composition No. | Houseflies Knocked Down or Killed | | |
|---|---|---|---|
| | Knockdown (%) | | Mortality (%) |
| | 15 minutes | 60 minutes | 24 hours |
| 1 | 0 | 0 | 0 |
| 2 | 0 | 0 | 0 |
| 3 | 100 | 100 | 38 |
| 4 | 100 | 86 | 3 |
| 5 | 100 | 100 | 87 |
| 6 | 100 | 89 | 18 |
| 7 | 100 | 100 | 70 |
| 8 | 100 | 93 | 11 |

Compositions 1 and 2 which contained diisophorone hydrazone as the sole active ingredient did not knock down or kill any of the houseflies. Compositions 3 and 4, respectively, containing 0.02 per cent and 0.01 per cent pyrethrin (but which did not contain diisophorone hydrazone) knocked down all of the flies within 15 minutes. The flies treated with Composition 3 were knocked down at 60 minutes, but 14 per cent of the flies treated with Composition 4 had revived within 60 minutes.

A 24-hour mortality observation showed that 38 per cent of the flies treated with Composition 3 were killed, but only 3 per cent of the flies treated with Composition 4 were killed. The cage of flies treated with Composition 5 showed that 100 per cent of the flies were knocked down at 50 and 60 minutes and that 87 per cent were dead within 24 hours. The cage of flies treated with Composition 6 indicates 100 per cent of the flies were knocked down in 15 minutes, 11 per cent had revived within 60 minutes, and 18 per cent were killed within 24 hours. The flies treated with Composition 7 were knocked down at 15 minutes and remained in that state at 60 minutes, 70 per cent being dead at 24 hours. Of the flies treated with Composition 8, 100 per cent were knocked down in 15 minutes, 93 per cent were knocked down in 60 minutes, and 11 per cent were dead within 24 hours. The foregoing experiments demonstrate that the addition of 0.25 per cent hydrazone to 0.02 per cent pyrethrin results in increase in kill of 120 per cent over the kill effected by composition which contained the same amount of pyrethrin but which did not contain diisophorone hydrazone. Results of this experiment further indicate the compositions containing 0.01 per cent pyrethrin to which 0.25 weight per cent of diisophorone hydrazone had been added resulted in a slight increase in knockdown of the flies in 60 minutes but a 600 per cent increase in the kill over compositions which contained the same amount of pyrethrins but which did not contain diisophorone.

The experiments also show that compositions containing 0.02 per cent pyrethrins to which 0.1 per cent diisophorone hydrazone had been added resulted in a significant increase in the knockdown of flies at 60 minutes and almost 100 per cent increase in the mortality of the houseflies at 24 hours over the kill of compositions which contained the same amount of pyrethrins but which did not contain diisophorone hydrazone. The results further show that compositions containing 0.01 weight per cent of pyrethrins to which 0.1 per cent diisophorone hydrazone had been added show a slight increase in the knockdown of flies at 60 minutes and a 360 per cent increase in the 24 hours mortality of the flies over compositions which contained the same amount of pyrethrins but which did not contain diisophorone hydrazone. The results shown in the combination are the results of replicate experiments.

In the foregoing example, when a mixture of cinerin I and cinerin II; e.g., the sample did not contain appreciable amounts of pyrethrin I or pyrethrin II, are employed in place of the pyrethrin mixture employed in that example, substantially the same results are obtained; e.g., an increase in kill and knockdown, when diisophorone is combined with the cinerin mixtures.

EXAMPLE 8

Other Insecticidal Formulations

The following seven compositions containing the ingredients and the percentages listed in Table III below were prepared. Composition 9 was an experimental control, contained diisophorone hydrazone in the amount specified but did not contain pyrethrins. Compositions 10 and 11 were also experimental controls, contained pyrethrins in the amounts specified but did not contain diisophorone hydrazone. Compositions 12 through 15 were experimental formulations which contained varying quantities of diisophorone hydrazone and pyrethrins in the amounts specified in Table III. The compositions were prepared by dispersing diisophorone hydrazone and/or the pyrethrin in 10 milliliters of acetone. To this dispersion there was added Triton X–100, a commercially available nonionic surfactant manufactured by Rohm & Haas, Inc. This formulation was dispersed in water and insect contact was effected by spraying the water dispersions immediately above cages containing cockroaches.

TABLE III

| Ingredient | Composition No. (percent) | | | | | | |
|---|---|---|---|---|---|---|---|
| | 9 | 10 | 11 | 12 | 13 | 14 | 15 |
| Diisophorone hydrazone | 0.5 | | | 0.5 | 0.5 | 0.25 | 0.25 |
| Pyrethrin* | | 0.05 | 0.025 | 0.05 | 0.025 | 0.05 | 0.025 |
| Acetone | 10.0 | 10.0 | 10.0 | 10.0 | 10.0 | 10.0 | 10.0 |
| Triton X-100** | 1.0 | 1.0 | 1.0 | 1.0 | 1.0 | 1.0 | 1.0 |
| Water | 88.5 | 88.95 | 88.975 | 88.45 | 88.475 | 88.70 | 88.725 |

*A commercially available pyrethrin insecticide of pyrethrin I and pyrethrin II obtained by extraction of the flowers of *Chrysanthemum coccineum*.
**A commercially available nonionic surfactant manufactured by Rohm & Haas, Inc.

EXAMPLE 9

Insecticidal Activity of Insecticidal Formulations Against Cockroaches

Seven separate cages (10 inches by 10 inches by 10 inches), each containing 20 adult male cockroaches, were sprayed at 6 inches above each cage with a one ml. volume, respectively, of one of the compositions described in Table III. The results of the experiments are shown in Table IV below.

TABLE IV

| Composition No. | German Cockroaches Knocked Down or Killed Knockdown (%) | | Mortality (%) |
|---|---|---|---|
| | 15 minutes | 60 minutes | 48 hours |
| 9 | 0 | 0 | 0 |
| 10 | 80 | 68 | 15 |
| 11 | 45 | 40 | 3 |
| 12 | 85 | 95 | 93 |
| 13 | 63 | 73 | 85 |
| 14 | 88 | 90 | 85 |
| 15 | 50 | 50 | 35 |

Composition 9, which contained diisophorone hydrazone as the sole active ingredient, did not knock down or kill any of the cockroaches. Composition 10, which contained 0.05 per cent pyrethrin but which did not contain diisophorone hydrazone, knocked down 80 per cent of the cockroaches in 15 minutes; 60 per cent of these were knocked down at 60 minutes. 15 per cent of the cockroaches were dead at 48 hours. Composition 11, which contained 0.25 per cent pyrethrins but which did not contain diisophorone hydrazone, knocked down 45 per cent of the cockroaches in 15 minutes and 40 per cent of the cockroaches were still knocked out at 60 minutes. Three per cent of the cockroaches were killed within 48 hours.

Composition 12, which contained 0.05 per cent diisophorone hydrazone and 0.05 per cent pyrethrin, knocked down 85 per cent of the cockroaches within 15 minutes, 95 per cent of the cockroaches within 60 minutes; and at 48 hours 93 per cent of the cockroaches were dead.

Composition 13, which contained 0.5 per cent diisophorone hydrazone and 0.025 per cent pyrethrins, knocked down 63 per cent of the cockroaches within 15 minutes and 73 per cent within 60 minutes; and at 48 hours 85 per cent of the cockroaches were dead.

Composition 14, which contained 0.25 per cent diisophorone hydrazone and 0.05 per cent pyrethrin, knocked down 88 per cent of the cockroaches within 15 minutes, 90 per cent within 60 minutes; and at 48 hours 85 per cent of the cockroaches were dead.

Composition 15, which contained 0.25 per cent diisophorone hydrazone and 0.025 per cent pyrethrin knocked down 50 per cent of the cockroaches at 50 and 60 minutes; and at 48 hours 35 per cent of the cockroaches were killed.

The foregoing experiment demonstrates that the addition of 0.5 per cent diisophorone hydrazone to a composition containing 0.05 per cent pyrethrin results in a significant increase in the knockdown of German cockroaches at 30 and 60 minutes and results in a 550 per cent increase in the mortality of the cockroaches within 48 hours.

The experiment further demonstrates the increase of 0.5 per cent diisophorone hydrazone to a composition containing 0.025 per cent pyrethrin results in substantially 100 per cent increase in knockdown of the cockroaches at 50 minutes and 60 minutes and between a 2,000 and 3,000 per cent increase in the kill of cockroaches over compositions containing an identical quantity of pyrethrins.

EXAMPLE 10

Sunscreen Lotions

Sunscreen lotions having the ingredients in the amounts listed in Table V below were prepared.

TABLE V

| Ingredient | Weight (%) | |
|---|---|---|
| | Composition 1 | Composition 2 |
| *Acetulan | 5 | 4.4 |
| Diisophorone hydrazone | 2 | — |
| Di(diisophorone) azine | — | 1.8 |
| Isopropyl myristate | 43 | 50.0 |
| Mineral oil | 50 | 43.8 |

L6 *Registered trademark of American Cholesterol Products, Inc., Miltown, N. J., for acetylated lanolin alcohols.

When such lotions are applied to the skin of human beings who are exposed to sunlight, they effectively prevent severe sunburn.

Examples 5 through 10 were repeated except that diisophorone phenylhydrazone, diisophorone dimethyl hydrazone, diisophorone β-hydroxyethyl hydrazone, diisophorone benzoyl hydrazone, di(diisophorone) azine, diisophorone esters of lower monocarboxylic acids, and diisophorone N-methyl carbamate were employed in place of the diisophorone hydrazone employed in thos Examples.

Results comparable to those of Examples 5 through 10 were obtained in each instance.

Having thus described the invention, what is claimed is:

1. A compound of the formula:

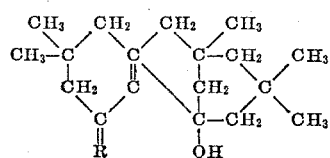

where R is selected from the group consisting of

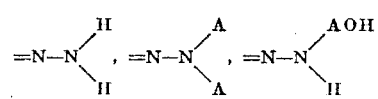

and

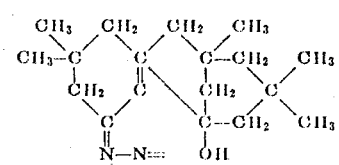

where A is lower alkyl and AOH is lower alkylol.

2. The compound of claim 1 wherein R is

3. The compound of claim 2 where R is
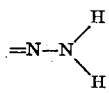
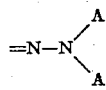
4. The compound of claim 3 where A is methyl.
5. The compound of claim 1 where R is
6. The compound of claim 5 where AOH is ethylol.
7. The compound of claim 1 where R is
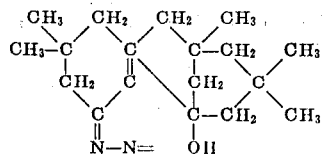
* * * * *